Oct. 31, 1967 W. W. SIEKANOWICZ ETAL 3,350,663

LATCHED FERRITE CIRCULATORS

Filed Jan. 27, 1966 5 Sheets-Sheet 1

INVENTORS
WIESLAW W. SIEKANOWICZ &
WILLIAM A. SCHILLING &
IRWIN BARDASH

BY Edward J. Norton
Attorney

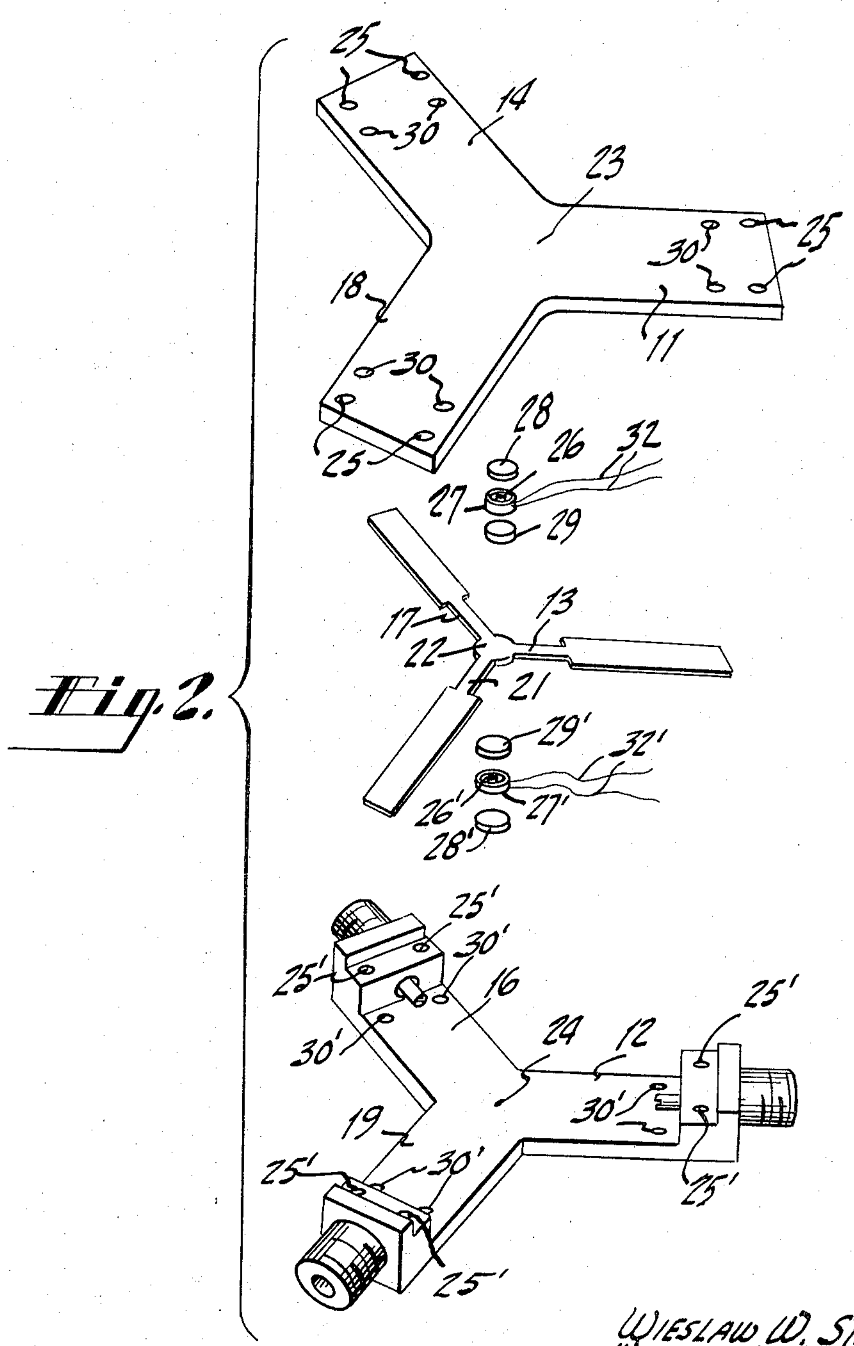
INVENTORS
WIESLAW W. SIEKANOWICZ
WILLIAM A. SCHILLING &
IRWIN BARDASH
BY Edward J. Norton
Attorney LATCHED FERRITE CIRCULATORS
Filed Jan. 27, 1966 5 Sheets-Sheet 3
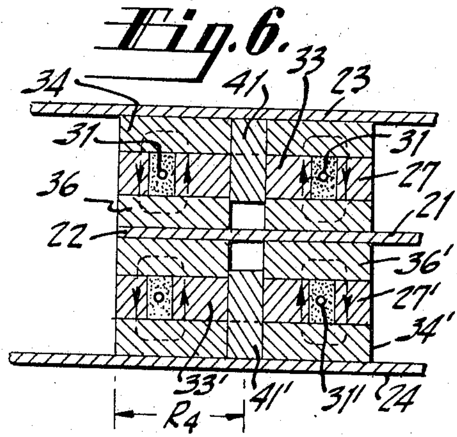
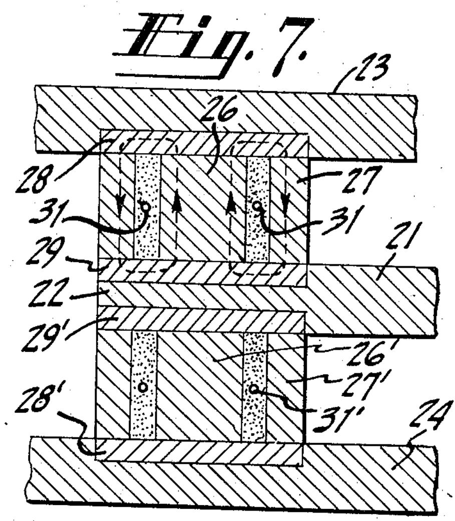
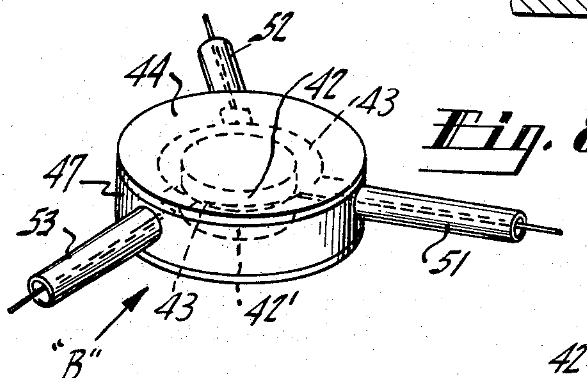
Fig. 8.
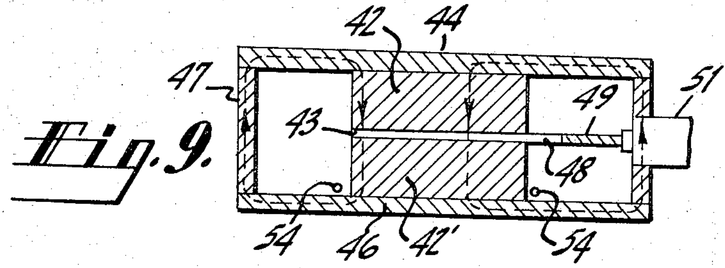
Fig. 9.
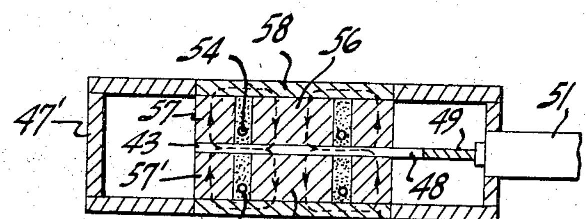
Fig. 10.
INVENTORS
WEISLAW W. SIEKANOWICZ
WILLIAM A. SCHILLING &
IRWIN BARDASH
BY Edward J. Norton
Attorney LATCHED FERRITE CIRCULATORS
Filed Jan. 27, 1966 5 Sheets-Sheet 4
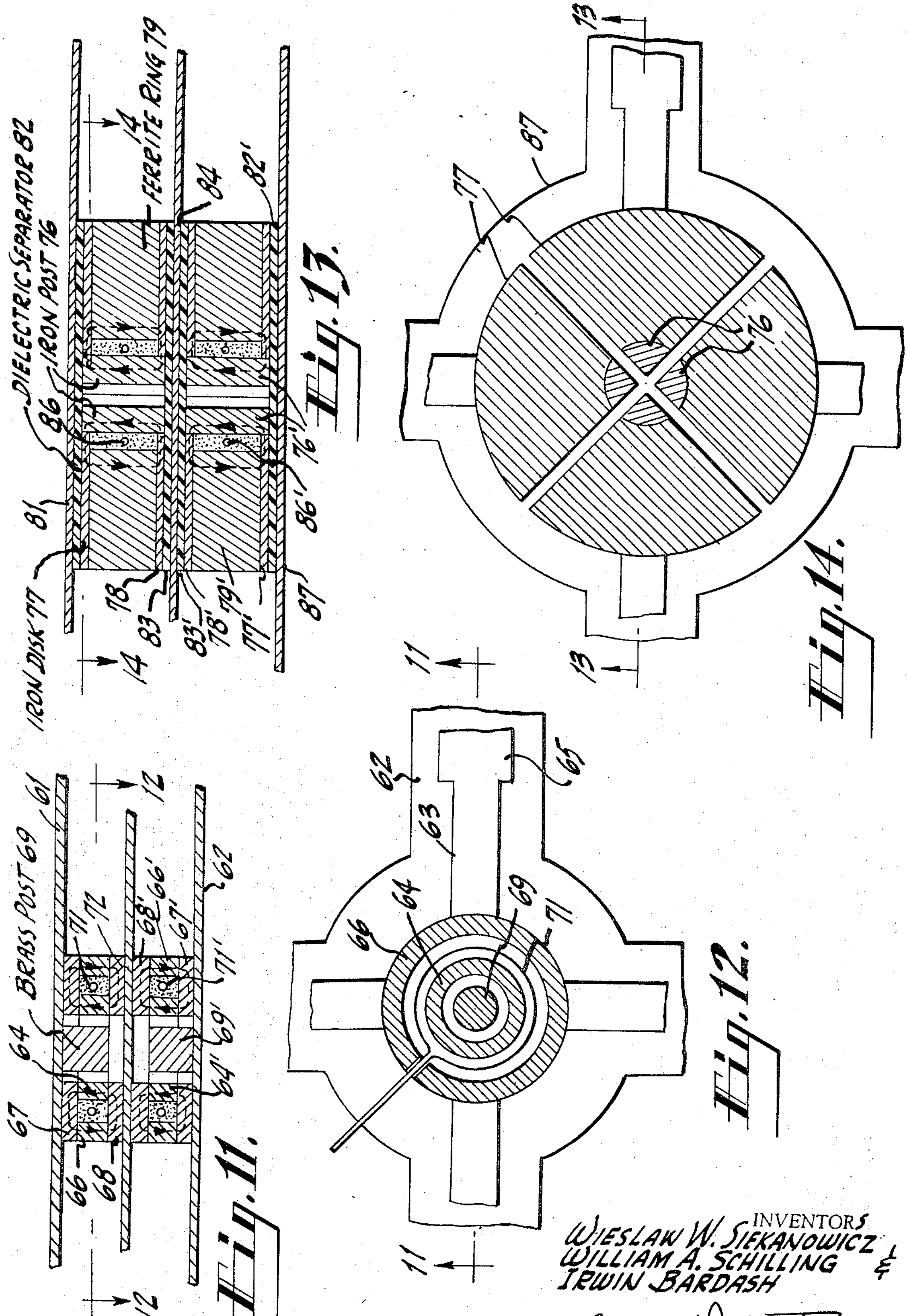
INVENTORS
WIESLAW W. SIEKANOWICZ,
WILLIAM A. SCHILLING &
IRWIN BARDASH
BY Edward J. Norton
Attorney Oct. 31, 1967 W. W. SIEKANOWICZ ETAL 3,350,663

LATCHED FERRITE CIRCULATORS

Filed Jan. 27, 1966 5 Sheets-Sheet 5

INVENTORS
WIESLAW W. SIEKANOWICZ
WILLIAM A. SCHILLING &
IRWIN BARDASH

BY Edward J. Norton
Attorney

United States Patent Office 3,350,663

Patented Oct. 31, 1967

3,350,663

LATCHED FERRITE CIRCULATORS

Wieslaw W. Siekanowicz, Trenton, William A. Schilling, Metuchen, and Irwin Bardash, Willingboro, N.J., assignors to Radio Corporation of America, a corporation of Delaware Filed Jan. 27, 1966, Ser. No. 523,372
7 Claims. (Cl. 333—1.1)

ABSTRACT OF THE DISCLOSURE

This invention provides a latching ferrite circulator in which a ferrite unit is placed and centered solely at the common region of three or more transmission lines joined together to form the circulator. A magnetizing loop passes in its entirety within the ferrite unit and around the center of the ferrite unit. Upon the application of current through the loop, a magnetic flux flow is produced through the center portion of the ferrite unit to magnetize it at a remanent state. The end portions of the ferrite unit provide the closed magnetic path for the return flux flow of the magnetic flux.

This invention relates to improved ferrite circulators, and particularly to circulators that do not require an external magnet such as a permanent magnet.

Ferrite circulators that require external magnets are known in the art. They are described, for example, in IEEE Transactions on Microwave Theory and Techniques for January 1965, in the article beginning on page 15, entitled Operation of the Ferrite Junction Circulator, and in Electronics for Sept. 22, 1961, in the article beginning on page 37, entitled Ferrite Components for UHF and Microwave Systems. The use of an external magnet adds to the size and weight of a circulator.

An object of the invention is to provide an improved ferrite circulator.

A further object of the invention is to provide a ferrite circulator of reduced size and weight.

A still further object of the invention is to provide a switchable latching-type ferrite circulator.

In practicing one embodiment of the invention, the ferrite is positioned at the junction of three or more transmission lines, three lines if a three-port circulator. Instead of the ferrite being positioned in a D-C magnetic field provided by a permanent magnet or electromagnet, the ferrite is latched by passing a pulse of D-C current through a magnetizing loop so that when this pulse terminates the ferrite will operate at the remanent flux density. Thus, the internal D-C magnetic flux density, required for circulator operation, is provided by the remanence (latched state) of the ferrite.

The term "ferrite" as applied to our circulator defines a material which is insulating, magnetic, and has gyromagnetic properties. The material may be, for example, a cubic ferrite, a hexagonal ferrite, or a magnetic garnet.

The invention will be described in detail with reference to the accompanying drawing in which:

FIG. 1 is a view in perspective of a circulator constructed in accordance with one embodiment of the invention;

FIG. 2 is an exploded view of the circular shown in FIG. 1;

FIG. 3 is an elevation in section of FIG. 1 looking in the general direction of the arrow A;

FIG. 4 is an elevation in section similar to that of FIG. 3, but illustrating another embodiment of the invention;

FIGS. 5, 6 and 7 are elevations in sections illustrating other embodiments of the invention;

FIG. 8 is a view in perspective of an embodiment of the invention in which a box of high remanence iron is included in the structure;

FIG. 9 is an elevation in section of FIG. 8 looking in the general direction of the arrow B;

FIG. 10 is an elevation in section similar to that of FIG. 9, but illustrating another embodiment of the invention;

FIG. 11 is a cross-sectional view of still another embodiment of the invention, this view being taken on the line 11—11 of FIG. 12 looking in the direction of the arrows;

FIG. 12 is a view taken on the line 12—12 of FIG. 11 looking in the direction of the arrows;

FIG. 13 is a cross-sectional view of still another embodiment of the invention, this view being taken on the line 13—13 of the FIG. 14 looking in the direction of the arrows;

FIG. 14 is a view taken on the line 14—14 of FIG. 13 looking in the direction of the arrows;

Figures 1, 3, 4, 5:
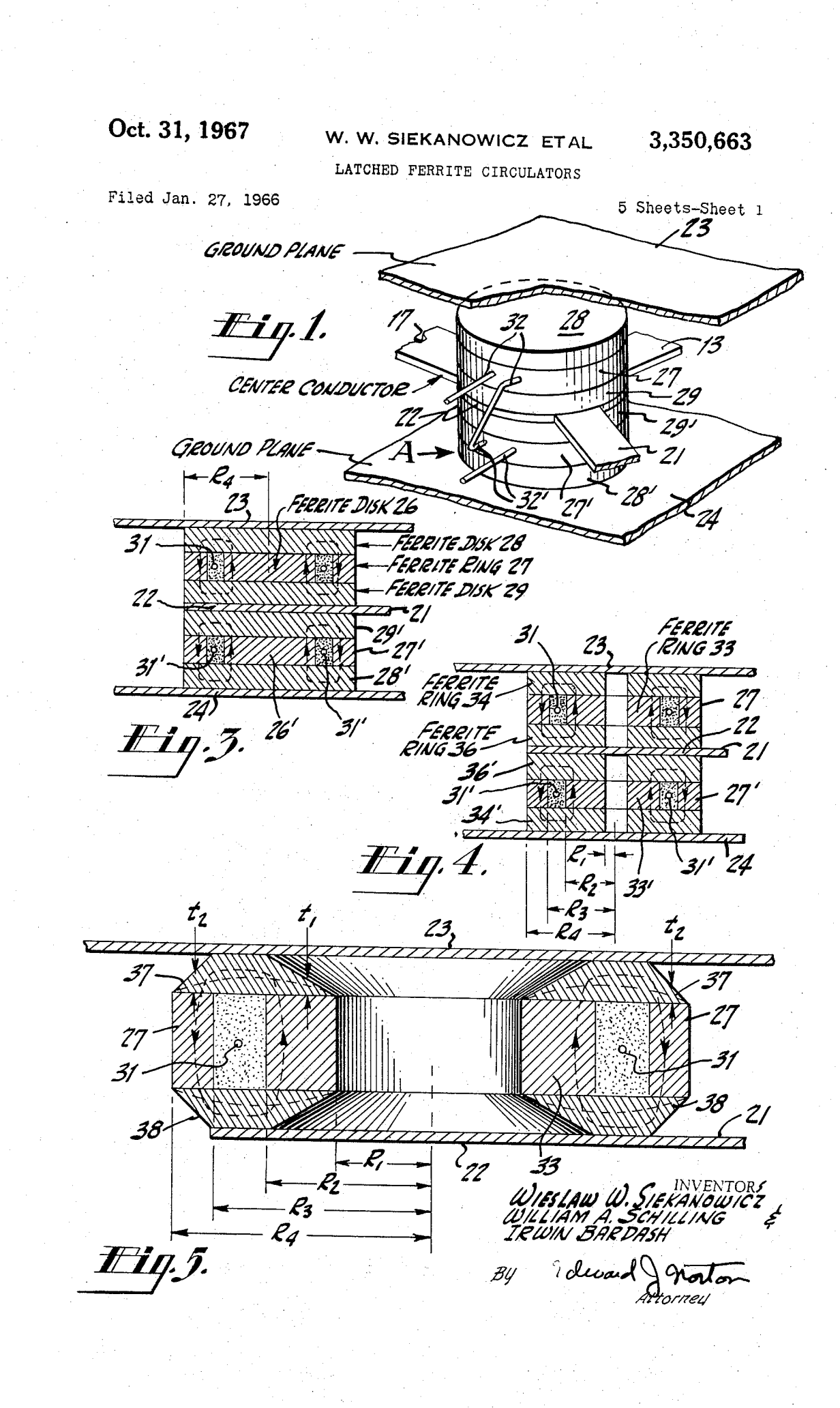
Figure 16:
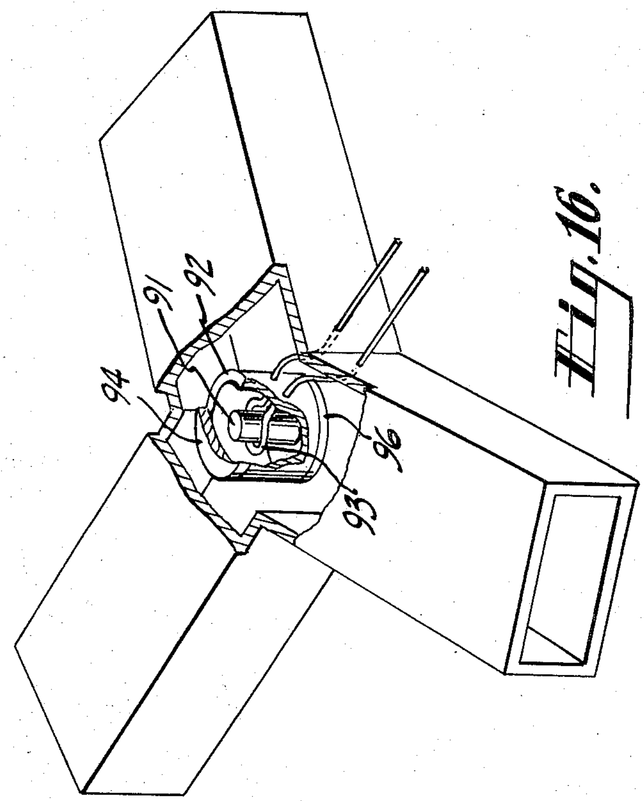
FIG. 16 is a view in perspective of an embodiment of the invention as applied to waveguides.

Before describing the embodiment of the invention shown in FIGS. 1, 2 and 3, attention is directed to the prior art ferrite junction circulator, shown, for example, in FIG. 1 of the above-mentioned IEEE Transaction's article. This prior art circulator comprises a single ferrite disk between the upper ground conductor and the center conductor of a strip transmission line, and another single ferrite disk between the lower ground conductor and the center conductor of said strip transmission line. In this prior art embodiment, the ferrite disks are positioned at the junction of three strip transmission lines (in the case of a three-port circulator), and the ferrite disks are located in the magnetic field of a permanent magnet or electromagnet to provide the ferrite with the internal D-C magnetic flux density required for circulator operation.

The basic operation of our improved circulator is the same as that of the above-described prior art circulator. Referring now to FIGS. 1, 2 and 3, in this embodiment the circulator comprises three strip transmission lines connected together at a common junction, each line having upper and lower ground planes and a center conductor. One strip transmission line comprises upper and lower ground planes 11 and 12, respectively, and a center conductor 13. A second strip transmission line comprises upper and lower ground planes 14 and 16, respectively, and a center conductor 17. A third strip transmission line comprises upper and lower ground planes 18 and 19, respectively, and a center conductor 21. The junction of the three center conductors in this example, is in the shape of a disk 22. The junctions of the upper and lower ground planes are indicated at 23 and at 24, respectively.

The term "strip transmission line" includes various transmission lines that propagate signal in the TEM mode. It includes, for example, various parallel plate transmission lines, whether or not dielectric material is used.

The ferrite unit positioned between the upper ground plane and the center conductor consists of a ferrite disk 26, a ferrite ring 27, a ferrite disk 28 in contact with the top of the disk 26 and the ring 27, and a ferrite disk 29 in contact with the bottom of the disk 26 and the ring 27.

The inner periphery of ring 27 is spaced from the periphery of the disk 26. Within this space, and surrounding the disk 26, a conducting turn is positioned to function as a magnetizing loop 31. The ends of the loop 31 are brought out through openings in the ring 27 as shown particularly in FIG. 1 and appear as magnetizing lead-in conductors 32. The loop 31 is held in position by dielectric material that fills the space between the disk 26 and the ring 27. The dielectric material may be omitted and the magnetizing loop supported in any suitable manner.

The ferrite unit positioned between the lower ground plane and the center conductor is the same as above described with the parts that correspond to the above-described unit having the same reference characters with a prime added.

The magnetizing loops 31 and 31' may be connected in parallel or, as indicated in FIG. 1, they may be connected in series in the direction to make the magnetizing current flow in the same direction around both loops. Current flow through the magnetizing loops 31 and 31' in the counter clockwise direction (viewed from the top) produces magnetization in the direction shown by the arrows on the flux lines surrounding the loops as shown in FIG. 3. Referring, for example, to the upper ferrite unit in FIG. 3, the direction of the flux lines is upward through the ferrite disk 26, through the ferrite disk 28, down the ferrite ring 27, and through the ferrite disk 29 and back to the disk 26. A pulse of D-C current through the magnetizing loops causes this same flux flow in the lower ferrite unit. It will be seen that, for the direction of current flow assumed, the magnetic flux flows upwardly in the ferrite disks 26 and 26', and that it flows downwardly in the ferrite rings 27 and 27'. This feature of flux flow in opposite directions in the ferrite unit will be discussed later. The direction of this flux flow in rings 27 and 27', and therefore the direction of magnetization, is transverse to the direction of propagation of signal through the transmission lines, and also is transverse to the components of the radio frequency magnetic field in the ferrite region.

In the particular structure illustrated in FIG. 2, the three strip transmission lines are coupled to three coaxial lines, respectively. The upper and lower ground planes are connected to the outer conductor of the coaxial line. The center conductor is connected to the inner conductor of the coaxial line, as by inserting it in a slit in the end of the inner conductor and soldering it. The upper ground planes are secured in spaced relation to the lower ground planes by screws or bolts that pass through holes 25 and 25'. Precise spacing of the ground planes and center conductor may be ensured by means of bolts (not shown) passing through holes 30 and 30' in the ground plates. Precision machined blocks are placed between the ground planes and the center conductor, and the bolts are tightened until contact is made with the blocks. The blocks are then removed.

It may be preferred to provide a circular that is the same as that shown in FIGS. 1, 2 and 3 except that one ground plane of the strip transmission lines and one ferrite unit are omitted. Referring to FIG. 2, such a circulator is provided by omitting the upper ground planes 11, 14 and 18, and by omitting the ferrite unit 26, 27, 28, 29.

Figure 15:
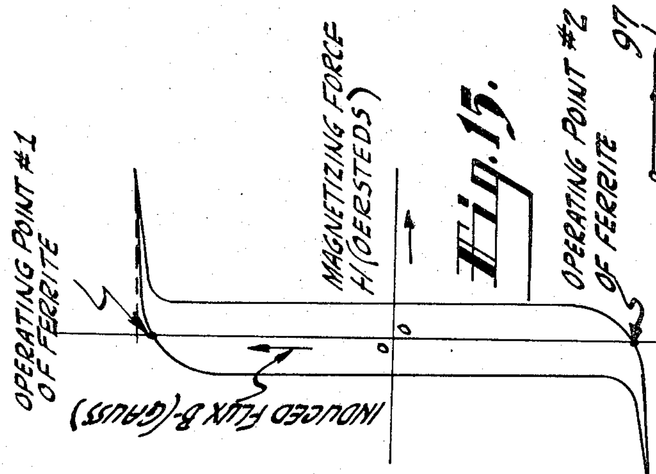
FIG. 15 illustrates the hysteresis loop of a ferrite material that may be used in the invention.

As previously indicated, the circulator is put into operating condition by passing a pulse of direct current through the magnetizing loops. FIG. 15 shows the hysteresis loop for a suitable ferrite for use in our circulator. The pulse of current through the magnetizing loops produces a magnetizing force which magnetizes the ferrite substantially to magnetic saturation. Termination of the D-C pulse reduces the magnetizing force to zero. The ferrite remains magnetized (latched up at remanence) because the magnetic path is closed entirely within the magnetic material and the demagnetizing effects are therefore absent. This is the operating point (indicated in FIG. 15) of the ferrite during the circulator action. Thus, the D-C pulse latches up the ferrite to provide the internal D-C magnetic flux density required for circulator action, and no external magnet is required.

The circulator may be switched to operate in either direction, depending upon the polarity of the D-C pulse.

It operates in one direction when the polarity of the current pulse is in the direction to latch the ferrite at operating point #1 (FIG. 15), and it operates in the other direction when the polarity of the current pulse is reversed to latch the ferrite at operating point #2.

Various ferrites are suitable for use in our improved circulator. Suitable ferrites preferably have a high squareness ratio (typically greater than 0.8), a low coercive force (typically below 1 oersted), and low RF losses (typically below 1 db). As here used "squareness ratio" is defined as $B_r$ divided by $B_{max}$ where $B_r$ is the flux density (gauss) at remanence and $B_{max}$ is the maximum flux density (gauss) produced during the current pulse.

Suitable ferrites for our circulator for use in the C band are types G1001, G1004, and G113 manufactured and sold by Trans-Tech, Inc. of Gaithersburg, Md. If the circulator is to be used in the X band, the Trans-Tech ferrite types TT1–390 and G1600 are suitable.

It will be noted that in our latched-type ferrite circulator all the ferrite (the entire ferrite unit) is in the radio frequency interaction region. This is evident from an inspection of FIG. 3, for example. Referring to FIG. 3 and the upper ferrite unit only, it will be seen that the flux flows vertically in one direction (upwardly in this illustration) through the ferrite disk 26. The return path of the flux flow is horizontally through the ferrite disk 28, vertically and downwardly in the ferrite ring 27, and horizontally through the ferrite disk 29. As would be expected, and as is the fact, the horizontal flux flow plays only a minor role in the circulator action because this is not the proper flux direction for any substantial interaction with the RF field.

It may be noted that in designing the above-described circulator embodiment, the radius $R_4$ of the outer periphery of the outer ferrite ring may be approximately the same as the radius of the ferrite disk in the above-identified prior art circulator where a single ferrite disk is located between the center conductor and a ground plane and where an external magnet is provided to establish a magnetic field within the ferrite disk.

However, for optimum operation the radius $R_4$ is commonly slightly less than the radius of the ferrite disk in said prior art circulator.

FIG. 4 illustrates an embodiment of the invention which is the same as that of FIGS. 1, 2 and 3 except that ferrite rings 33 and 33' replace the ferrite disks 26 and 26' of FIG. 3, and ferrite rings 34, 36 and 34', 36' replace the ferrite disks 28, 29 and 28', 29'.

In our circulator all the ferrite elements may be of the same ferrite or they may be of different ferrites. For example, the disk 26 and the ring 27 may be of different ferrites with the cross-sectional areas adjusted for continuity of flux. Assume, for example, that in FIGS. 1, 2 and 3, the elements 26, 27, 28 and 29 are of the same ferrite. In this case, it is preferred for optimum operation that the cross-sectional area of the inner ferrite element (for example, disk 26 in FIG. 3 or ring 33 in FIG. 4) which is transverse to the magnetic flux flow be equal to the corresponding cross-sectional area of the outer ferrite ring (ring 27 in FIGS. 3 and 4). Therefore, in the embodiment of FIG. 4, for example, assuming the inner and outer rings are of the same ferrite, these rings preferably are dimensioned so that $$\pi(R_2^2-R_1^2=\pi(R_4^2-R_3^2)$$

Also, preferably the cross-sectional area of the ferrite for the horizontal return path of the flux is made approximately equal to the above-identified cross-sectional area of the outer ferrite ring and of the inner ferrite ring or ferrite disk. For example, referring to FIG. 4, the ferrite rings 34 and 36 have a thickness T at the outer periphery of ferrite ring 33 and at the inner periphery of ferrite ring 27 (and between these peripheries) which may be specified as follows:

The cross-sectional area of ferrite ring 34 perpendicular to the horizontal flux flow is $T\times 2\pi R_2$ at the radius $R_2$.

The cross-sectional area of the inner ring 33 perpendicular to the flux flow is $\pi(R_2^2-R_1^2)$.

For these cross-sectional areas to be equal, $$T\times 2\pi R_2=\pi(R_2^2-R_1^2)$$

or $$T=\frac{R_2^2-R_1^2}{2R_2}$$

The ferrite rings for the horizontal flux return path may be of uniform thickness of the thickness T as calculated above. However, the volume of ferrite in these rings may be reduced as next described in connection with FIG. 5.

FIG. 5 illustrates an embodiment of the invention that differs from that of FIG. 4 in that a variable cross-section return path is provided for the horizontal flow of magnetic flux. In FIG. 5 only one ground plane and one ferrite unit are illustrated. The mirror image of this structure may be added, if desired, thus providing two ground planes and a second ferrite unit. The direction of flux flow in this second ferrite unit is the same as in the first ferrite unit, flux flow directions being the same as shown in FIG. 4.

In FIG. 5 the ferrite rings 37 and 38 provide the return paths for the horizontal flow of flux. These rings vary in cross section in such a way as to reduce the volume of the ferrite required to provide the return path. One advantage of this reduction in volume is that it decreases the amount of energy required for switching the circulator.

The cross-section of the return path rings 37 and 38 may be determined as now described. First, to reduce the return path volume it is required that all portions of the horizontal return path operate at the same remanence as the ferrite rings 27 and 33. This requirement leads to the following expressions for the thickness $t$ and thickness $t_2$ in the inner and outer ring regions, respectively (FIG. 5):

$$t_1=\frac{(R^2-R_1^2)}{2R} \qquad t_2=\frac{R_4^2-R^2}{2R}$$

where $R_1$ is the radius of the inner periphery of the ferrite ring 33, where $R_4$ is the radius of the outer periphery of the ferrite ring 27, and where R is the radius out to the region $t_1$ or the region $t_2$ that is being calculated. The cross sections of the rings 37 and 38 may be determined in the same way. In most practical cases the shapes of the return path rings 37 and 38 can be approximated by straight lines as follows. The thickness $t_1$ at radius $R_2$ may be calculated, and a straight line then drawn from this calculated point to the inner periphery of ring 33. Similarly, the thickness $t_2$ at radius $R_3$ is calculated, and a straight line is then drawn from this calculated point to the outer periphery of ring 27. A straight line is then drawn between the two calculated points.

The thickness of the ferrite for the horizontal return path of the flux may be reduced by using a ferrite for this return path having a remanence that is higher than the remanence of the main ferrite rings 27 and 33 (FIG. 5). This is shown by the following equations for the thickness $t_1$ and $t_2$ indicated in FIG. 5:

$$t_1=\frac{R^2-R_1^2}{2R}\cdot\frac{\text{Remanence of main ferrite rings}}{\text{Remanence of horiz. return path ferrite}}$$

$$t_2=\frac{R_4^2-R^2}{2R}\cdot\frac{\text{Remanence of main ferrite rings}}{\text{Remanence of horiz. return path ferrite}}$$

While the design of our circulator is similar to the above-described prior art circulator, for optimum operation there are certain differences for some of the embodiments as will appear from the following discussion of the design.

For all the embodiments, the ferrite may be selected to have a remanence (one of the operating points, FIG. 15) that typically is 0.5

$$\frac{\text{(center frequency in megacycles/sec.)}}{2.8}$$

The center frequency is that of the signal being applied to the circulator. This also is a typical remanence for the above-identified prior art circulator. This sets the circulator operation on the lower side of the ferrite resonance.

A calculation may then be made, assuming this remanence, for the diameter of the ferrite disk of the above-described prior art circulator shown in FIG. 1 of the above-identified IEEE Transactions and in FIG. 2(B) of the above-identified Electronics.

For the disk-and-ring embodiments of FIGS. 1, 2 and 3, the outer diameter $R_4$ of the ferrite ring 27 preferably is made about ten percent smaller than the calculated radius of the prior art ferrite disk. The spacing between the ferrite disk 26 and the ring 27 is made as small as practicable, this spacing typically being about twenty mils. The radius of the disk 26 and the inner radius of the ring 27 are determined by the requirement that for optimum operation the cross-sectional area of the disk 26 should be equal to the cross-sectional area of the ring 27 as previously discussed if both disk and ring are of the same ferrite. The thickness of the ferrite for the horizontal return flux flow has also been previously discussed.

The amplitude and duration of the current pulse passed through the magnetizing loop for latching up the ferrite are not critical, providing they are sufficiently large to approach saturation. It may be mentioned that if the circulator is to be switched in microseconds, the energy of the current pulse is in the tens of microjoules.

In the embodiment of FIG. 6, which is next described, the inner radius of the inner ring is determined by the diameter of the brass posts.

In the above-described embodiment of the invention the impedance of the ferrite units looking into them from the strip transmission lines is greater than the corresponding impedance of the ferrite disks in the above-identified prior art circulator; in our disk-and-ring embodiment of FIGS. 1, 2 and 3, this impedance is about fifty-five percent greater; in the inner ring and outer ring embodiment such as shown in FIG. 4, this impedance is about one hundred and fifty percent greater. The impedance matching of the strip transmission lines to the ferrite units is done in accordance with conventional practice, principally by making the center conductor of each transmission line of the proper width.

FIG. 6 illustrates an embodiment of the invention that is similar to that of FIG. 4 except that conducting posts 41 and 41', such as brass posts, are inserted in the center of the inner ferrite rings and connected to the ground planes. These posts permit a reduction in the cross-section of the inner ferrite ring 33. The posts 41 and 41' need not be in contact with the inner surface of the ferrite ring 33; instead they may be of smaller diameter and out of contact with the ferrite. In some instances it may be found desirable to have the posts 41 and 41' extend to the center conductor so that each post connects the center conductor to a ground plane.

FIG. 7 illustrates an embodiment of the invention that is similar to that of FIG. 3 except that the ferrite disks 28, 29 and 28', 29' for the return flux path are recessed in the ground planes and in the center conductor of the strip transmission lines so that they are flush with the transmission line surfaces. This recessing of the return flux with path places the horizontal magnetic flux out of the RF interaction region so that its effect on the circulator action is reduced even further.

FIGS. 8 and 9 illustrate an emdobiment of the invention in which the return flux path for the ferrite is through soft iron, preferably high remanence iron. In this example, ferrite disks 42 and 42' are located between the center conductor 43 and the ground planes 44 and 46, respectively, of three strip transmission lines. The ground planes 44 and 46 are the top and bottom, respectively, of a round iron box 47 made entirely of soft iron. In the example illustrated, the center conductor 43 is a disk of high remanence iron of the same diameter as that of the ferrite disks, and is the junction of the three strip transmission lines. The center conductors of the three strip transmission lines extend as short tabs from the center disk 43, each of which connects to the center conductor of a coaxial line coupling to the circulator, the outer conductor of the coaxial line being connected to the box 47. One of these tabs is shown at 48. It is coupled to the center conductor 49 of a coaxial line 51. As shown in FIG. 8, three coaxial lines 51, 52 and 53 (in the case of a three-port circulator) couple to the three strip lines, respectively, in the same manner as shown in FIG. 9.

A conductor 54 encircles one of the ferrite disks to function as a magnetizing loop. When a pulse of direct current is passed through the loop 54, the magnetic flux lines pass through the ferrite disk 42, the iron center conductor 43, the ferrite disk 42' and through the return path provided by the iron box, as indicated. As in the other embodiments described, the D-C pulse drives the ferrite disks substantially to magnetic saturation, and upon termination of the pulse the ferrite remains magnetized at remanence, i.e., at one of the operating points shown in FIG. 15.

In the example of FIGS. 8 and 9, the iron box preferably is made of high remanence iron, preferably of several times greater remanence than that of ferrites, so that a minimum thickness of iron may be used.

In the embodiment of FIGS. 8 and 9, the diameter of the ferrite disks 42 and 42' is the same as that of the ferrite disks in the above-identified prior art circulator.

FIG. 10 illustrates an embodiment of the invention that is similar to that of FIGS. 8 and 9 except that a ferrite disk 56 and a ferrite ring 57 replace the ferrite disk 42. Also, except for soft iron disks 58 and 59 above and below the ferrite, the box 47' is made of non-magnetic material such as brass. In this structure a D-C pulse through the magnetizing loops 54 and 54' drives the ferrite disks 56 and 56' and the ferrite rings 57 and 57' substantially to magnetic saturation, the flux flow being through the ferrite disk 56, the iron center conductor 43, the ferrite ring 57 and through the iron disk 58; also through the ferrite disk 56', the iron disk 59, the ferrite ring 57', and through the iron center conductor 43. Upon termination of the D-C pulse the ferrite remains magnetized at remanence.

FIGS. 11 and 12 show an embodiment of the invention which structurally resembles the embodiment of FIG. 6 except that it is a four-port circulator instead of a three-port circulator. It comprises four strip transmission lines, each having ground planes 61 and 62 and a center conductor 63. The center conductor may be increased in width as shown at 65 to match the impedance of the coaxial line coupled thereto.

The ferrite units are located at the junction of the four transmission strip lines. The ferrite unit between the upper ground planes and the center conductors comprises an inner ferrite ring 64, an outer ferrite ring 66, and ferrite rings 67 and 68 for the horizontal flux return path. A conducting post 69, which may be of brass, is connected to the ground plate 61 and extends into the center of the ferrite unit. The magnetizing coil or loop is indicated at 71.

The structure of the ferrite unit between the lower ground planes and the center conductors is a mirror image of the other ferrite unit, and corresponding parts are indicated by the same reference characters with a prime added.

The junction of the four center conductors is a conducting disk 72 which preferably is of the same radius as that of the outer periphery of the outer ferrite ring 66.

For four-port circulator operation, the diameter and length of the brass posts 69 and 69' are adjusted so that the resonant frequencies of the $n=1$ and $n=0$ modes are approximately equal to the operating frequency as described for the prior art four-port circulator in the above-identified IEEE Transaction's article.

FIGS. 13 and 14 show an embodiment of the invention in which the magnetic flux return path is provided by an iron post 76 and iron disks 77 and 78, the iron preferably being high remanence iron. The ferrite unit consists of a ferrite ring 79. The iron post 76 and iron disk 77 are insulated from the upper ground plane 81 of the strip transmission lines by a dielectric separator 82. A dielectric separator 83 insulates the center conductor disk 84 from the iron post 76 and the iron disk 78. The magnetizing loop is indicated at 86.

The ferrite unit structure and associated return path structure located between the center conductor disk 84 and the lower ground plane 87 of the strip transmission lines are a mirror image of the corresponding structure above it with similar parts indicated by the same reference characters with a prime added.

As indicated in FIG. 13, referring to the upper ferrite unit, a pulse of current through the magnetizing loop 86 produces a flow of magnetic flux downwardly through the ferrite ring 79 in the example illustrated, through the iron disk 78, through the iron post 76, and through the iron disk 77. Thus, the ferrite is latched up to its operating point.

In order to reduce eddy current losses the posts 76 and 76', and the iron disks 77, 78, 77' and 78' preferably are severed as illustrated, only four severances being shown for simplicity. However, a large number of severances may be required for fast switching speeds.

In the embodiment illustrated in FIGS. 13 and 14, the circulator operates as a four-port circulator, there being four strip transmission lines that couple into the ferrite units. For four-port operation, the diameter of the iron posts 76 and 76' and the inner and outer diameters of the ferrite rings 79 and 79' are adjusted so that the resonant frequencies of the $n=1$ and $n=0$ modes are approximately equal to the operating frequency.

The embodiment of FIGS. 13 and 14 may be changed to a three-port circulator. In this case there are only three strip transmission lines coupling into the ferrite units as in the three-port circulators previously described.

Our invention may be applied to a waveguide junction circulator as shown in FIG. 16. In this example the circulator is a three-port circulator comprising three rectangular waveguides meeting at a junction with the waveguides 120 degrees apart. Instead of the prior art arrangement having a ferrite post positioned in a magnetic field provided by an external magnet, the circulator of FIG. 16 has a ferrite post 91 at the junction of the waveguides, surrounded by a ferrite ring 92. A magnetizing loop 93 surrounds the post 91, this loop preferably being supported by dielectric material, not shown. The horizontal flux return path is provided by ferrite disks 94 and 96 set on the top and bottom, respectively, of the ferrite ring 92. It will be apparent that, except for the dimensions, this ferrite unit is the same as the ferrite unit (the upper one, for example) shown in our FIG. 3 embodiment, and the ferrite is latched up as described in connection with FIG. 3. Although only strip transmission line circulators and a waveguide circulator are shown, the term "transmission line" used in this specification and claims includes the various other types of transmission lines either of the open and non-conventional types or closed types which may be latched in accordance with the teaching of this invention.

Regarding the dimensions of the ferrite unit in FIG. 16, the radius of the outer periphery of the ferrite ring 92 may be made approximately the same as the radius of the ferrite post in the prior art waveguide circulator. As in the strip transmission line embodiments of the invention, the magnetic flux flow is in opposite directions in the post and ring.

Figure 17:
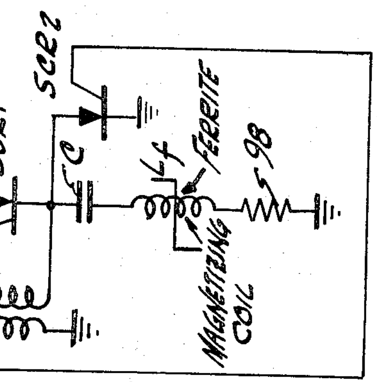
FIG. 17 is the circuit diagram of a suitable driver circuit for supplying pulse power to our improved circulator.

There are various suitable circuits that may be employed for supplying the desired current pulse through the magnetizing loops of our circulators for latching up the ferrite. One suitable circuit for this purpose is shown in FIG. 17. In operation, a single negative pulse at the pulse input passes through a transformer 97 and turns on a silicon controlled rectifier SCR–1. This causes a pulse of current to flow from the B+ supply through SCR–1, through a capacitor C, through the magnetizing coil or loop, and through a resistor 98 to ground. The resistor 98 provides damping that prevents oscillatory action. The ferrite element to be latched up is indicated at $L_f$. The voltage B+ and the circuit constants of capacitor C and of resistor 98 are selected so that the peak charging current is sufficient to bring the ferrite element $L_f$ to the desired saturated state.

The current pulse terminates when capacitor C is fully charged, and the ferrite element is latched up at remanence at one of the operating points, such as operating point #1 (FIG. 15). The ferrite element remains latched up at this operating point until a positive pulse is applied at the pulse input.

A positive pulse at the pulse input turns on a silicon controlled rectifier SCR–2, thus discharging capacitor C. The resulting discharge current pulse flows in the reverse direction through the magnetizing coil and drives the ferrite element $L_f$ to saturation in the opposite direction. At the termination of the discharge pulse, the ferrite element is again latched up at remanence, but this time with opposite magnetization at the operating point #2 (FIG. 15). This switches the circulator for operation in the opposite direction.

Instead of using a pulse generating circuit, such as shown in FIG. 17, for switching the circulator, for some applications it may be switched by passing alternating current through the magnetizing loop. For example, a 60 cycle current may be passed through the magnetizing loop whereby one-half cycle switches in one direction and the other half cycle switches in the other direction, each half cycle corresponding to a current pulse.

The term "signal" as used in the claims includes radio frequency energy such as that used, for example, for heating purposes.

What is claimed is:

1. A circulator comprising,
at least three transmission lines coupled to one another at a common region,
a ferrite unit positioned and centered solely within said common region with its axis perpendicular to the central axis of each of said transmission lines,
at least one magnetizing loop passing in its entirety within said ferrite unit and looping around the central portion of said ferrite unit to produce a magnetic flux flow through the center portion of said ferrite unit to magnetize it at a remanent state when pulse of current is passed through said loop and terminated,
said ferrite unit including a magnetic portion within said magnetizing loop for passing said flux flow,
said ferrite unit providing a closed magnetic path for the return flux flow through the end portions of said ferrite unit.

2. The invention according to claim 1 wherein said ferrite unit includes a central ferrite disc and a surrounding ferrite ring which is spaced from said central disc, and wherein said magnetizing loop is placed in the space between said central ferrite disc and the surrounding ferrite ring.

3. The invention as claimed in claim 2 wherein there is provided three transmission lines, and wherein said last-mentioned three transmision lines are oriented with their respective central axes defining equal angles.

4. A circulator comprising
at least three strip transmission lines for propagating a signal,
said lines being coupled to one another at a common region,
each of said transmission lines having a ground plane and a center conductor,
a cylindrical ferrite unit positioned and centered solely within said common region between said ground plane and said center conductor with its cylindrical axis perpendicular to the central axis of each of said transmission lines,
at least one magnetizing loop passing in its entirety within said ferrite unit and looping around the central portion of the ferrite unit to produce through said central portion of said ferrite unit a magnetic flux flow that is transverse to the signal excited radio frequency magnetic field in said region when a pulse of current is passed through said loop and terminated,
said ferrite unit including a magnetic portion within said magnetizing loop for passing said flux flow,
said ferrite unit providing a closed magnetic path for the return flux flow of said magnetic flux through the end portions of said ferrite unit.

5. A circulator comprising,
at least three transmission lines coupled to one another at a common region,
a ferrite ring positioned at said region,
a soft iron post positioned within and spaced from said ring leaving a space between said post and said ring,
soft iron members bridging said space at the top and bottom of said post and ring,
at least one magnetizing loop located in said space surrounding said post to produce a magnetic flux flow through said ferrite unit to magnetize it at a remanent state when a pulse of current is passed through said loop and terminated.

6. A circulator comprising,
at least three strip transmission lines for propagating a signal,
said lines being coupled to one another at a common region,
each of said transmission lines having a ground plane and a center conductor,
a central ferrite element and a ferrite ring surrounding and spaced from said central element, said central ferrite element and said ferrite ring being positioned and centered solely within said common region between said ground plane and center conductor,
a ferrite member at the top of said central ferrite element and said ferrite ring which member is in contact with said central ferrite element and said ferrite ring and which bridges the space between said central ferrite element and said ferrite ring and a ferrite member at the bottom of said central ferrite element and said ferrite ring which member is in contact with said central ferrite element and said ferrite ring and which bridges said space,
at least one magnetizing loop passed through said space between said central element and said ferrite ring to produce a magnetic flux flow through said central ferrite element to magnetize it at a remanent state when a pulse of current is passed through said loop and terminated,
said ferrite ring and said ferrite members providing a closed magnetic path for the return flux flow of said magnetic flux.

7. A circulator comprising
a plurality of strip transmission lines for propagating a signal,
said lines being coupled to one another at a common region,
said transmission lines being oriented with their axes defining equal angles, each transmission line including a center narrow conductor disposed between two outer planar conductors, at least one body of cylindrical ferrite material positioned and centered solely at said common region between said center conductor and one of said outer conductors with its cylindrical axis perpendicular to the central axis of each of said transmission lines, at least one other body of cylindrical ferrite material positioned and centered solely at said common region between said center conductor and the other of said outer conductors with its cylindrical axis perpendicular to the central axis of each of said transmission lines, at least one magnetizing loop passing in its entirety within said first-mentioned body of ferrite material and looping around the central portion of said first-mentioned body of ferrite material to produce a magnetic flux flow through the center portion of said first-mentioned body of ferrite material to magnetize it at a remanent state when a pulse of current is passed through said loop and terminated, at least one other magnetizing loop passing in its entirety within said second mentioned body of ferrite material and looping around the central portion of said second mentioned body of ferrite material to produce a magnetic flux flow through the center portion of said second mentioned body of ferrite material to magnetize it at a remanent state when a pulse of current is passed through said loop and terminated, said bodies of ferrite material including a magnetic portion within said respective magnetizing loops for passing said flux flow, said bodies of ferrite materials providing a closed magnetic path for the return flux flow of said magnetic flux through the end portions of said ferrite bodies, said magnetization of that part of said ferrite bodies that produces circulator action being transverse to the signal excited radio frequency magnetic field in said region and having a strength such that electric waves conducted by each of said lines couple only to one other of said lines with said last mentioned coupling being nonreciprocal.

References Cited

UNITED STATES PATENTS

| | | | |
|---|---|---|---|
| 3,079,570 | 1/1963 | Hickey | 333—1.1 |
| 3,174,116 | 3/1965 | Sur | 333—1.1 |
| 3,185,941 | 5/1965 | Freiberg | 333—1.1 |

HERMAN KARL SAALBACH, *Primary Examiner.*

ELI LIEBERMAN, *Examiner.*

P. L. GENSLER, *Assistant Examiner.*